(12) United States Patent
Diard

(10) Patent No.: US 8,345,052 B1
(45) Date of Patent: Jan. 1, 2013

(54) METHOD AND SYSTEM FOR USING A GPU FRAME BUFFER IN A MULTI-GPU SYSTEM AS CACHE MEMORY

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1138 days.

(21) Appl. No.: 11/937,474

(22) Filed: Nov. 8, 2007

(51) Int. Cl.
*G06F 15/16* (2006.01)
(52) U.S. Cl. ........................................ 345/502
(58) Field of Classification Search .................. 345/502
See application file for complete search history.

(56) References Cited

U.S. PATENT DOCUMENTS

| | | | | | |
|---|---|---|---|---|---|
| 5,408,629 | A | * | 4/1995 | Tsuchiya et al. | 711/151 |
| 5,914,730 | A | * | 6/1999 | Santos et al. | 345/531 |
| 5,920,881 | A | * | 7/1999 | Porterfield | 711/2 |
| 5,936,640 | A | * | 8/1999 | Horan et al. | 345/531 |
| 5,999,183 | A | * | 12/1999 | Kilgariff et al. | 345/418 |
| 5,999,743 | A | * | 12/1999 | Horan et al. | 710/56 |
| 6,157,398 | A | * | 12/2000 | Jeddeloh | 345/532 |
| 6,192,457 | B1 | * | 2/2001 | Porterfield | 711/206 |
| 6,195,734 | B1 | * | 2/2001 | Porterfield | 711/203 |
| 6,947,050 | B2 | * | 9/2005 | Jeddeloh | 345/532 |
| 7,293,129 | B2 | * | 11/2007 | Johnsen et al. | 710/313 |
| 7,663,635 | B2 | * | 2/2010 | Rogers et al. | 345/568 |
| 7,730,336 | B2 | * | 6/2010 | Marinkovic et al. | 713/320 |
| 7,756,014 | B1 | * | 7/2010 | Norrie | 370/218 |
| 2003/0158886 | A1 | * | 8/2003 | Walls et al. | 709/201 |
| 2008/0055321 | A1 | * | 3/2008 | Koduri | 345/505 |
| 2008/0276064 | A1 | * | 11/2008 | Munshi et al. | 711/173 |

OTHER PUBLICATIONS

Accelerated Graphics Port Interface Specification, Jul. 31, 1996, Intel Corporation, Revision 1.0.*

* cited by examiner

*Primary Examiner* — Daniel Washburn
(74) *Attorney, Agent, or Firm* — Patterson & Sheridan, LLP

(57) ABSTRACT

A method and system for using a graphics processing unit ("GPU") frame buffer in a multi-GPU computing device as cache memory are disclosed. Specifically, one embodiment of the present invention sets forth a method, which includes the steps of designating a first GPU subsystem in the multi-GPU computing device as a rendering engine, designating a second GPU subsystem in the multi-GPU computing device as a cache accelerator, and directing an upstream memory access request associated with an address from the first GPU subsystem to a port associated with a first address range, wherein the address falls within the first address range. The first and the second GPU subsystems include a first GPU and a first frame buffer and a second GPU and a second frame buffer, respectively.

20 Claims, 7 Drawing Sheets

METHOD AND SYSTEM FOR USING A GPU FRAME BUFFER IN A MULTI-GPU SYSTEM AS CACHE MEMORY

BACKGROUND OF THE INVENTION

1. Field of the Invention

Embodiments of the present invention relate generally to graphics systems and more specifically to a method and system for using a graphics processing unit ("GPU") frame buffer in a multi-GPU system as cache memory.

2. Description of the Related Art

Unless otherwise indicated herein, the approaches described in this section are not prior art to the claims in this application and are not admitted to be prior art by inclusion in this section.

With the increasing demand for realism and interactivity in graphics applications, some multi-GPU systems, such as the NVIDIA Quadro Plex visual computing systems, have been developed. These multi-GPU systems typically use a bus structure to connect the multiple GPUs. Each GPU is coupled with its own local frame buffer. However, the capacity of the local frame buffer usually becomes insufficient when a graphic-intense application occurs. For instance, texture maps that are needed in a rendering process of such a graphic-intense application often exceed such memory capacity. One convention approach is to use system memory to store any data that does not fit in the local frame buffer.

To illustrate, FIG. 1A is a simplified block diagram of a conventional system 100, which includes a central processing unit ("CPU") 108, BIOS 110, system memory 102, and a chipset 112 that is directly coupled to a graphics subsystem 114. The system memory 102 further contains a graphic driver 104 and a memory block 106. The chipset 112 provides system interfaces to the CPU 108, the system memory 102, the graphics subsystem 114, and other peripheral devices not shown in the figure. The graphics subsystem 114 includes two graphics adapters 120 and 130. Each graphics adapter has a single GPU. A primary GPU 126 and a secondary GPU 132 are coupled to their own local frame buffers 128 and 134, respectively. The primary GPU 126 and the secondary GPU 132 are also coupled to the chipset 112 via communication links such as Peripheral Component Interface ("PCI") Express.

When the local frame buffers 128 and 134 are full, if additional texture information needs to be stored, the conventional approach accesses the memory block 106 in the system memory 102 to store such texture information. Because the texture data is transported to or from the memory block 106 on the system bus of the system 100, one drawback of this approach is the polluting of the system bus. Specifically, if much of the system bus bandwidth is occupied with the texture data, then an undesirable latency is introduced to the delivery of other types of data, such as audio data. This latency forces the application needing this data, such as an audio playback application, to slowdown and thus negatively impacts its performance.

Another drawback of the conventional approach of using the memory block 106 to store texture data is the inefficiency of handling multiple texture requests contending to access the memory block 106. To illustrate, in conjunction with FIG. 1A, FIG. 1B shows a push (also commonly referred to as "blit") operation performed by the secondary GPU 132 and a pull and blend operation performed by the primary GPU 126. Typically, before the primary GPU 126 can scan out its local frame buffer 128 to a display device 138 in block 158, the secondary GPU 132 transfers the output of block 152 into the memory block 106 in a push operation in block 154. The primary GPU 126 then needs to pull the data from the memory block 106 and blend the data with the content of its local frame buffer 128 in block 156. Here, because both the primary GPU 126 and the secondary GPU 132 access the same memory block 106, the primary GPU 126 needs to wait until the secondary GPU 132 completes its push operation before it can proceed with its pull and blend operation. In other words, the push operation and the pull and blend operation are forced to be synchronized and can only occur in sequence.

As the foregoing illustrates, what is needed in the art is a method and system for using GPU frame buffers as caches to reduce system memory accesses and addressing at least the shortcomings of the prior art approaches set forth above.

SUMMARY OF THE INVENTION

A method and system for using a graphics processing unit ("GPU") frame buffer in a multi-GPU computing device as cache memory are disclosed. Specifically, one embodiment of the present invention sets forth a method, which includes the steps of designating a first GPU subsystem in the multi-GPU computing device as a rendering engine, designating a second GPU subsystem in the multi-GPU computing device as a cache accelerator, and directing an upstream memory access request associated with an address from the first GPU subsystem to a port associated with a first address range, wherein the address falls within the first address range. The first and the second GPU subsystems include a first GPU and a first frame buffer and a second GPU and a second frame buffer, respectively.

One advantage of the disclosed method and system is to provide a rendering engine additional cache memory in a cost effective manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
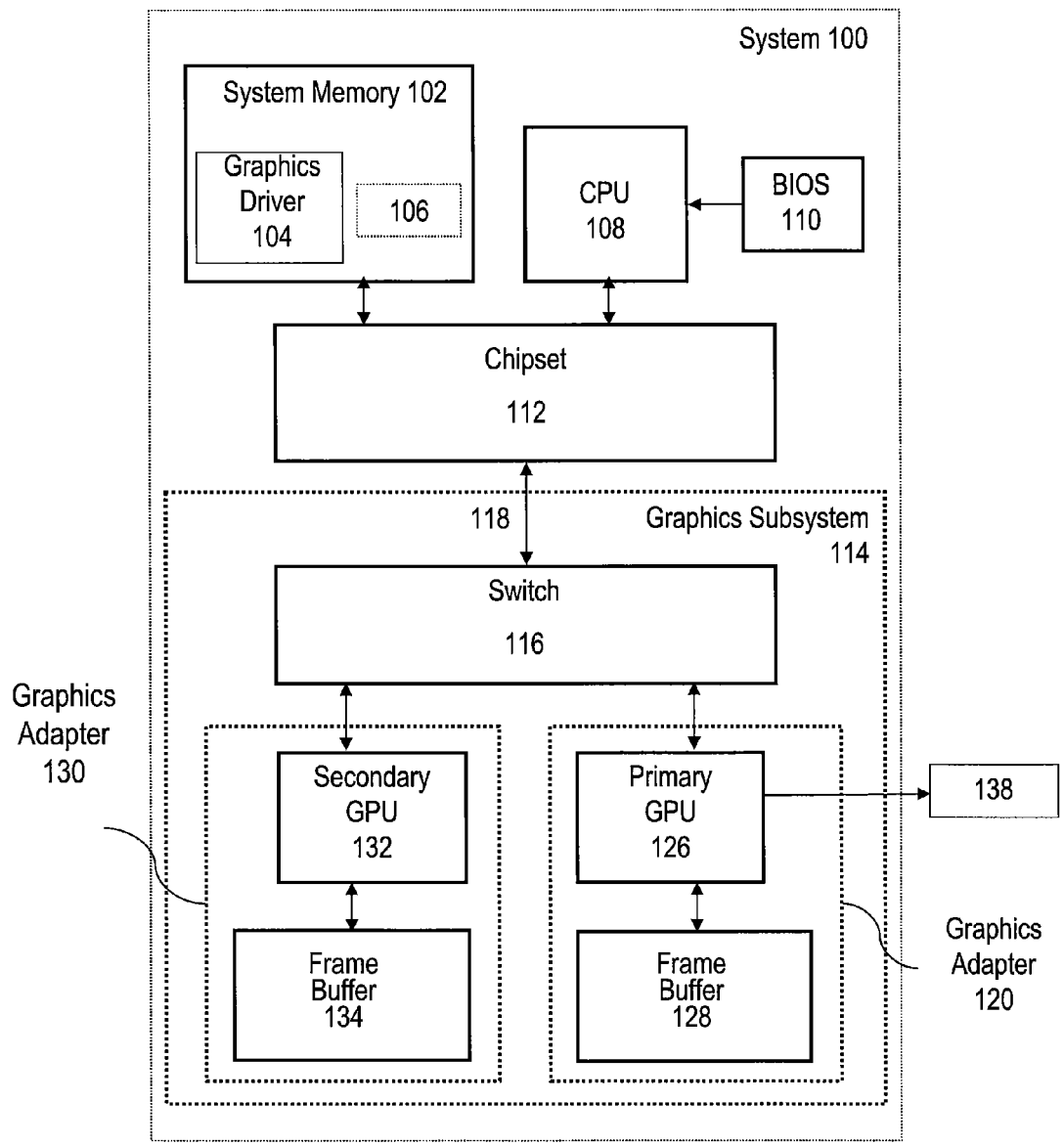
FIG. 1A is a simplified block diagram of a conventional system configured to store data that does not fit in the local frame buffer.
Figure 1B:
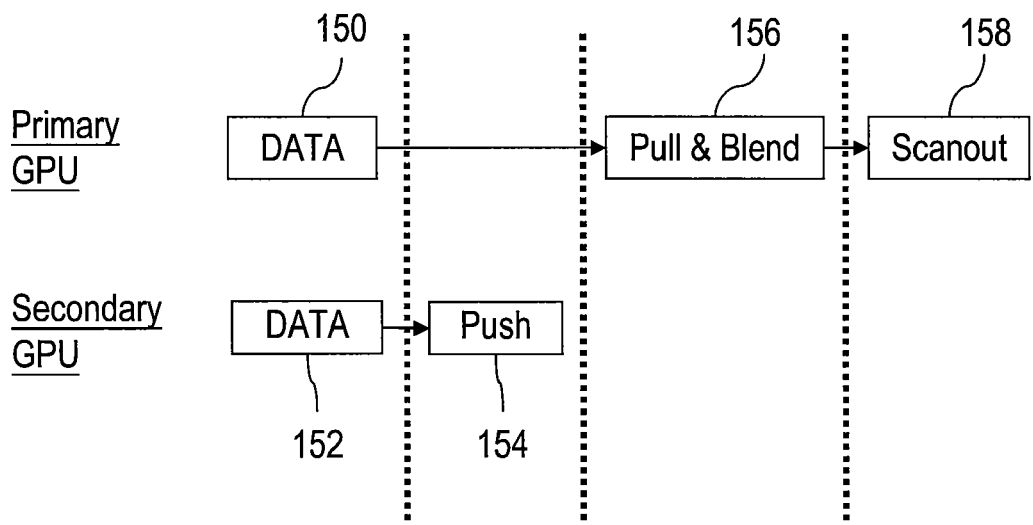
FIG. 1B illustrates a push operation performed by a secondary GPU and a pull and blend operation performed by a primary GPU in a conventional system.
Figure 2:
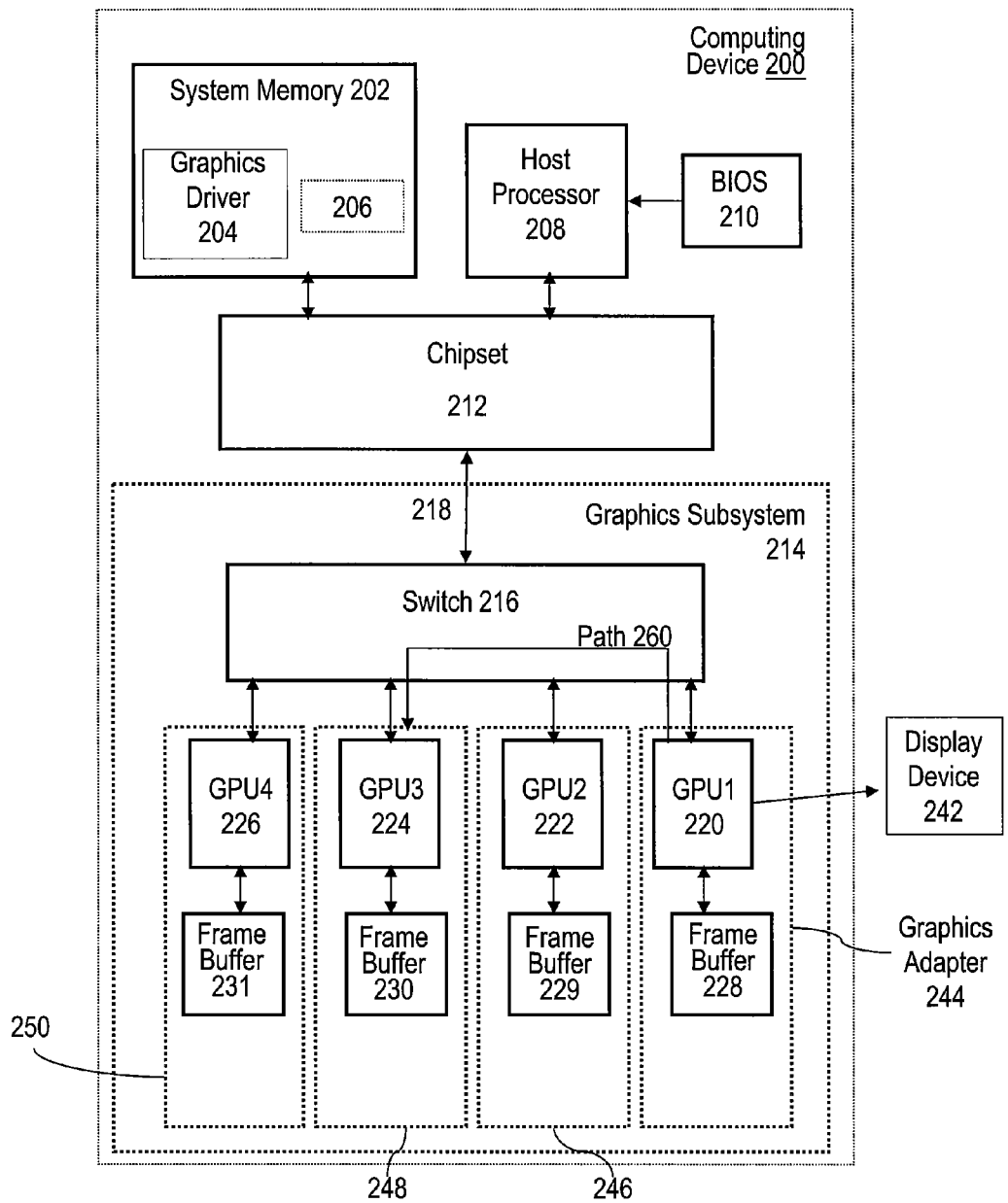
FIG. 2 is a computing device configured to use the frame buffers of various graphics adapters as caches, according to one embodiment of the present invention.

FIG. 2 is a computing device 200 configured to use the frame buffers of various graphics adapters as caches, according to one embodiment of the present invention. The computing device 200 includes a host processor 208, system memory 202, a chipset 212, and a graphics subsystem 214 coupled to the chipset 212. BIOS 210 is a program stored in read only memory ("ROM") or flash memory that is run whenever the computing device 200 boots up. The system memory 202 is a storage area capable of storing program instructions or data such as, graphics driver 204 and memory block 206 allocated to store texture data. The graphics subsystem 214 includes a switch 216 and graphic adapters 244, 246, 248, and 250. The graphics adapter 244 is further connected to a display device 242. Each of the graphics adapters 244, 246, 248, and 250 is a peer device to another in this implementation. Alternatively, they can be replaced with any adapter card that is supported by the chipset 212. In the implementation depicted in FIG. 2, each of these peer devices contains a GPU and a frame buffer. Although four graphics adapters 244, 246, 248 and 250 are currently shown, a person with ordinary skills in the art will recognize that other configurations with a different number of adapters are possible without exceeding the scope of the present invention.

The illustrated chipset 212 comprises one of many forms of structures that enable data to be transferred from one peer device to another peer device or to system memory. Such chipset includes an advanced switching network or a bridge device supporting Accelerated Graphics Port ("AGP"), PCI bus, PCI-Express™ ("PCIe") bus protocols, or any other form of structure that may be used to interconnect peer devices.

According to one embodiment of the present invention, one graphics adapter, such as the graphics adapter 244 shown in FIG. 2, is configured to be the rendering engine, and the other graphics adapters, such as the graphics adapters 246, 248, and 250, are configured to be cache accelerators. Specifically, each of the frame buffers 229, 230, and 231 is configured to be cache memory for the GPU1 220. The cache memory can store data such as texture data. In addition, in this configuration, the GPU2 222, GPU3 224, and GPU4 226 are only required to perform functions such as causing the cache accelerators to power up and making the frame buffers in the cache accelerators available to the GPU1 220. Thus, the GPUs in the cache accelerators do not have to support the same set of functions as the GPU1 220. For example, the GPU2 222, GPU3 224, and GPU4 226 may belong to the same class but the earlier versions of the GPU1 220. Alternatively, these GPUs do not even have to pass all the quality assurance testing. As long as they are able to cause the cache accelerators to successfully power up and make their frame buffers available to the rendering engine, these less-than-perfect GPUs can still be used in these cache accelerators.

Figure 3:
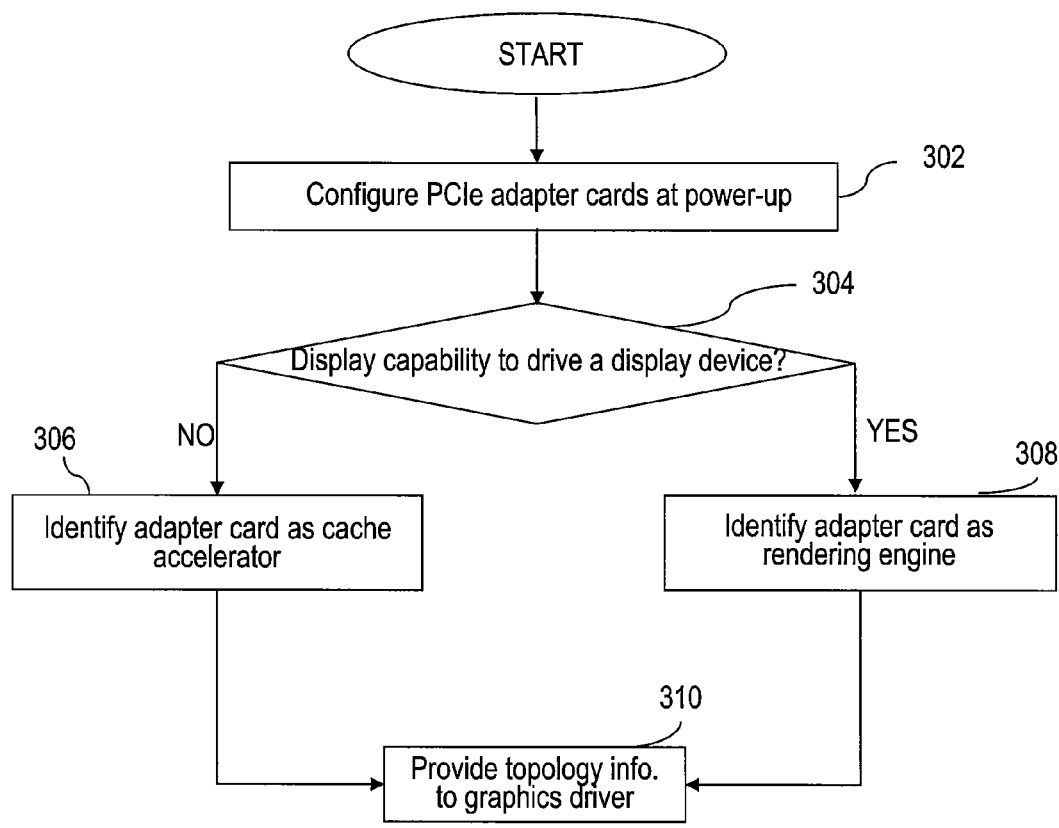
FIG. 3 illustrates a flow diagram of a process for configuring a multi-GPU system, such as the computing device shown in FIG. 2, according to one embodiment of the present invention.

FIG. 3 illustrates a flow diagram of a process 300 for configuring a multi-GPU system, such as the computing device 200 shown in FIG. 2, according to one embodiment of the present invention. Suppose the chipset 212 supports PCIe, and the graphics adapters 244, 246, 248, and 250 are PCIe adapter cards that have just been inserted in the appropriate PCIe slots of the computing device 200. When the computing device 200 powers up in step 302, the system BIOS 210 assigns certain system resources, such as address ranges, to each of the four PCIe adapter cards. Then, after the operating system of the computing device 200 takes over and loads the device drivers for these adapter cards, it begins to query each of the adapter cards for its display capability in step 304. If the adapter card is not configured to drive a display device, then in one implementation, the adapter card is viewed as a cache accelerator in step 306. Otherwise, the adapter card is recognized as the rendering engine in step 308. The operating system then presents the topology of these four adapter cards (i.e., the assigned address ranges of the one rendering engine and the three cache accelerators) to the graphics driver 204 in step 310. In one implementation, the display capability for each of the PCIe adapter cards is set in a particular key entry in the registry of the operating system.

Furthermore, the switch 216 of FIG. 2 has four ports, and each port is coupled to a graphics adapter and is associated with the system resources, such as the address range, assigned to the graphics adapter. So, suppose the GPU of the rendering engine, the GPU1 220, requests for some texture data at an address x, and suppose further that the address x falls within the address range R, which is assigned to one of the cache accelerators, the graphics adapter 248. The switch 216 responds to this upstream request from the GPU1 220 by directing the request downstream to the graphics adapter 248 along a peer-to-peer path 260 without accessing the system bus and the chipset 212.

Figure 4:
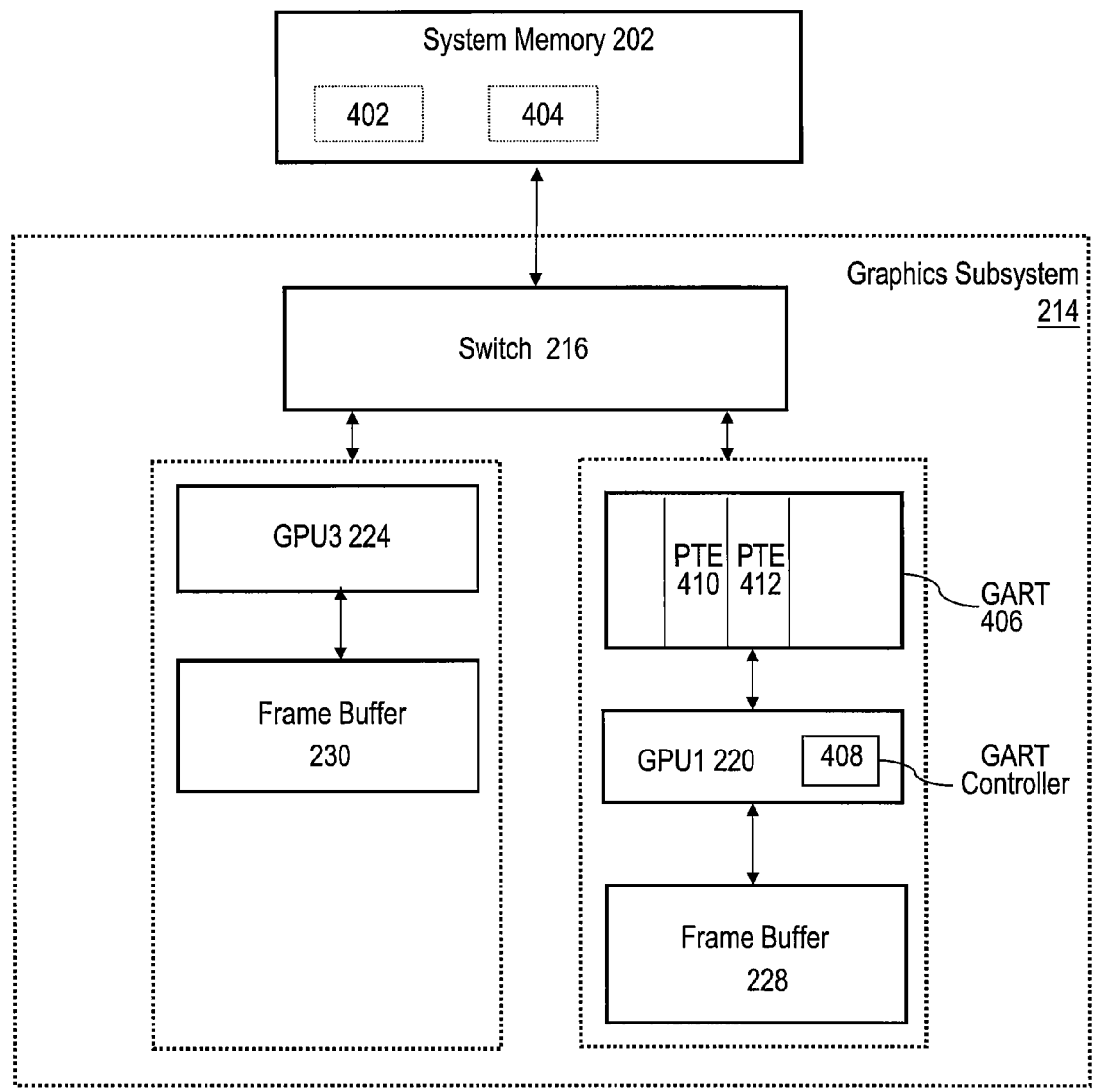
FIG. 4 is an exploded view of a peer-to-peer path with the use of a GART, according to one embodiment of the present invention.

Continuing with the example of conducting a peer-to-peer communication session between the graphics adapter 244 and the graphics adapter 248, in one implementation, a graphics address remapping table ("GART") is used to create a contiguous memory space for the GPU1 220. FIG. 4 is an exploded view of the peer-to-peer path 260 with the use of a GART 406, according to one embodiment of the present invention. Again in conjunction with FIG. 2, the GART 406 includes page table entries ("PTEs"), each of which corresponds to a physical page in the system memory 202. Even though the physical pages may be scattered throughout the system memory 202, they appear to be contiguous in the GART 406. For example, physical and scattered pages 402 and 404 shown in FIG. 4 correspond to the contiguous PTEs 410 and 412, respectively. In other words, through the GART 406, the GPU1 220 is able to operate on data, such as texture data, that reside in a seemingly linear memory space.

Figure 5:
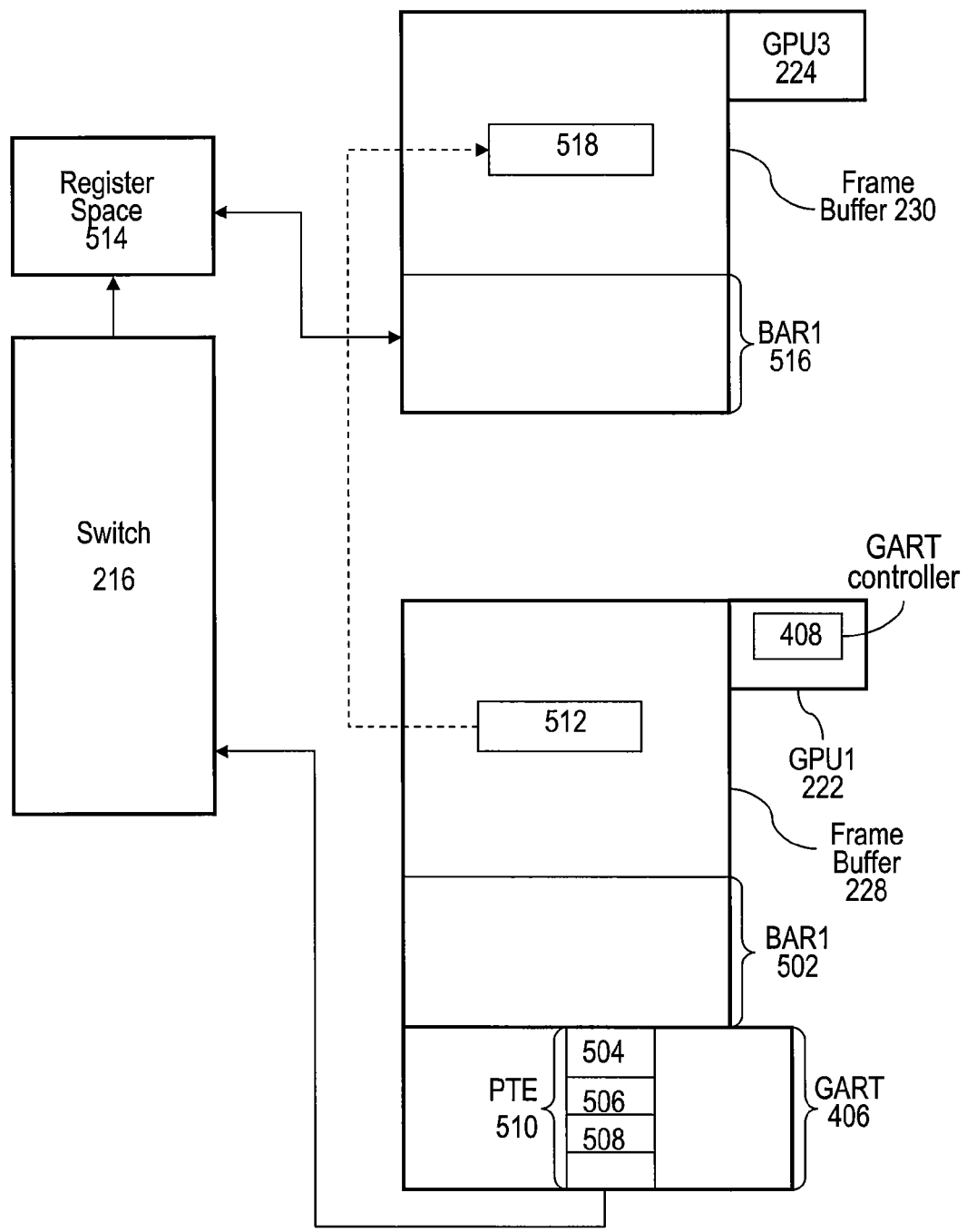
FIG. 5 illustrates one protocol that enables the GPU1 220 to access the entire frame buffers of the cache accelerators, according to one embodiment of the present invention.

It is worth noting that although the GPU1 220, the GPU in the rendering engine, recognizes that it can utilize the frame buffers 229, 230, and 231 in the cache accelerators that are coupled to the switch 216 as its cache memory, it does not have direct access to the entire frame buffers in the cache accelerators. FIG. 5 illustrates one mechanism that enables the GPU1 220 to access the entire frame buffers of the cache accelerators, such as the entire frame buffer 230, according to one embodiment of the present invention. To begin with, the GPU1 220 has full access to its local frame buffer, the frame buffer 228. Similarly, the GPU3 224 also has full access to the frame buffer 230. However, only the address range represented by base address register ("BAR") 1 516 is visible to the GPU1 220. Suppose the GPU1 220 requests to write certain texture data residing in a memory location 512 to a memory location 518, which is beyond the address range represented by the BAR1 516. Suppose further that a PTE 510 in the GART 406 associated with this write request includes certain entries, a peer identity entry 504 (e.g., the GPU3 224), a peer-to-peer entry 506 (e.g., a peer-to-peer communication session), and an offset entry 508 (e.g., 300 Mbytes). Via the switch 216, the GPU1 220 in one implementation writes the request with the aforementioned entries into a register space

514. In response to the modifications to the register space 514, the GPU3 224 makes the memory location 518 available to the GPU1 220.

Figure 6:
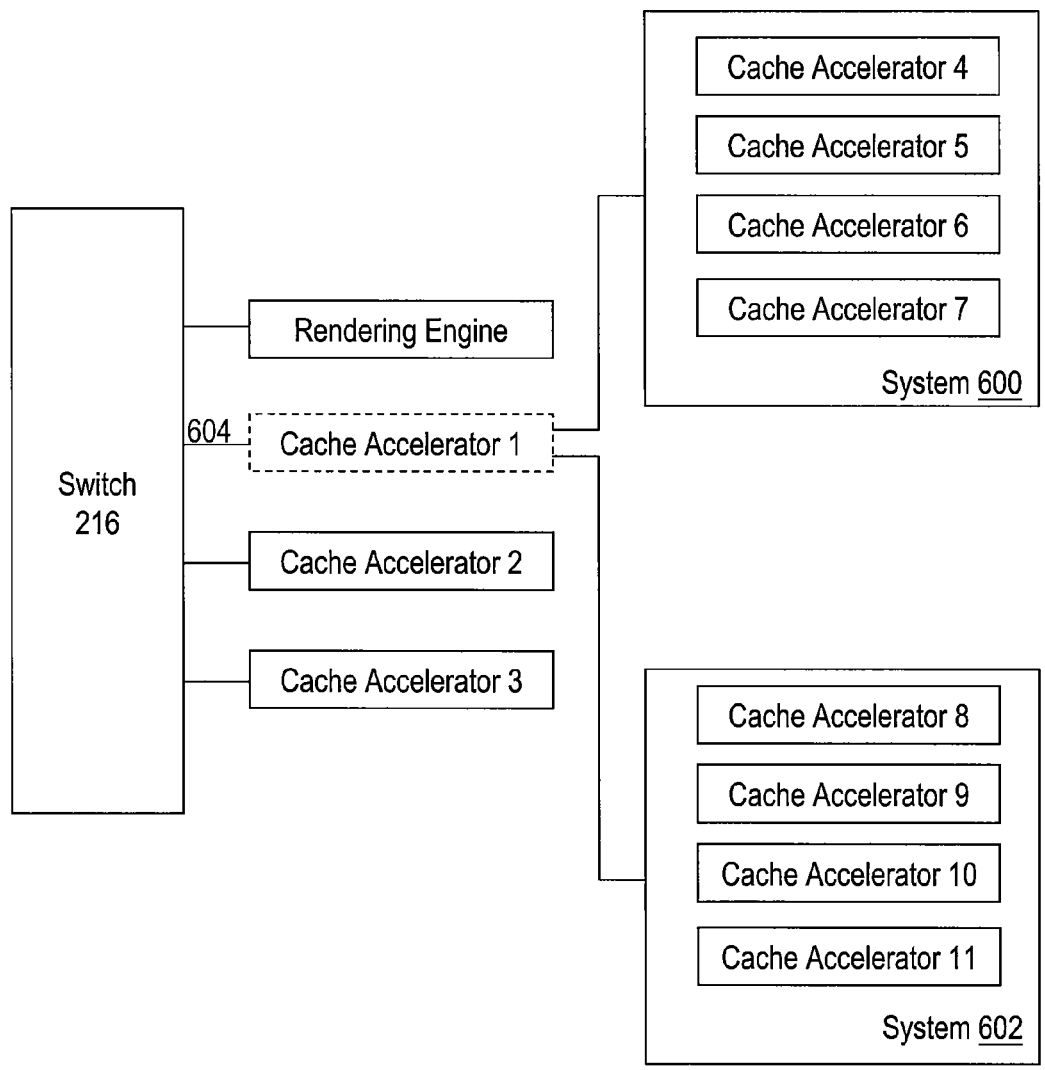
FIG. 6 illustrates a simplified block diagram of connecting additional cache accelerators, according to one embodiment of the present invention.

FIG. 6 illustrates a simplified block diagram of connecting additional cache accelerators, according to one embodiment of the present invention. As discussed above, in conjunction with FIG. 2, each of the ports of the switch 216 is configured to support an address range that covers the assigned address range of the adapter coupled to the port. To expand the number of cache accelerators coupled to the switch 216, the address ranges of multiple devices are combined. Suppose a port 606 of the switch 216 initially connects to a single cache accelerator 1 but now intends to support eight equivalent cache accelerators. In one implementation, the address range that the port 606 needs to cover is the union of the assigned address ranges of both system 600 and system 602. Thus, if the switch 216 receives a request with an address that falls within this union, then the switch 216 directs the request to the two systems, each including four cache accelerators.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

I claim:

1. A method for using a graphics processing unit ("GPU") frame buffer in a multi-GPU computing device as cache memory, comprising:
    designating a first GPU subsystem in the multi-GPU computing device as a rendering engine, wherein the first GPU subsystem includes a first GPU and a first frame buffer;
    designating a second GPU subsystem in the multi-GPU computing device as a cache accelerator, wherein the second GPU subsystem includes a second GPU and a second frame buffer; and
    directing an upstream memory access request associated with an address from the first GPU subsystem to a port associated with a first address range;
    configuring the first address range to cover a first portion of a second address range assigned to the second GPU subsystem;
    determining that the memory access request is directed to a second portion of the second address range, wherein the second portion of the second address range is not accessible to the first GPU; and
    redirecting the memory access request to a register communicatively coupled to the second frame buffer to cause the second portion of the second address range to be accessible by the first GPU.

2. The method of claim 1, further comprising writing data included in the memory access request to the second portion of the second address range.

3. The method of claim 1, wherein the directing step further comprising:
    combining a third address range assigned to a first system containing multiple cache accelerators with a fourth address range assigned to a second system also containing multiple cache accelerators to generate a combined address range;
    configuring the first address range to cover the combined address range; and
    coupling the first system and the second system to the port.

4. The method of claim 1, wherein the second GPU supports fewer functions than the first GPU.

5. The method of claim 4, wherein the functions supported by the second GPU include powering up the second GPU graphics subsystem and making the second frame buffer visible to the first GPU.

6. The method of claim 4, wherein the second GPU is an earlier version of the first GPU.

7. The method of claim 1, wherein the designating steps are based on capability of the first GPU subsystem and the second GPU subsystem as specified in a configuration file accessible by an operating system of the multi-GPU computing device.

8. A multi-GPU computing device configured to use a GPU frame buffer as cache memory, the computing device comprising:
    a first GPU subsystem in the multi-GPU system designated as a rendering engine, wherein the first GPU subsystem includes a first GPU and a first frame buffer;
    a second GPU subsystem in the multi-GPU system designated as a cache accelerator, wherein the second GPU subsystem includes a second GPU and a second frame buffer;
    a register that is communicatively coupled to the second frame buffer; and
    a switch configured to:
        direct an upstream memory access request associated with an address from the first GPU subsystem to a port associated with a first address range;
        configure the first address range to cover a first portion of a second address range assigned to the second GPU subsystem;
        determine that the memory access request is directed to a second portion of the second address range, wherein the second portion of the second address range is not accessible to the first GPU; and
        redirect the memory access request to the register to cause the second portion of the second address range to be accessible by the first GPU.

9. The multi-GPU computing device of claim 8, further comprising writing data included in the memory access request to the second portion of the second address range.

10. The multi-GPU computing device of claim 8, wherein the switch further configures the first address range to cover a combined address range to support a first system containing multiple cache accelerators and a second system containing multiple cache accelerators coupled to the port, wherein the combined address range is generated by combining a third address range assigned to the first system with a fourth address range assigned to the second system.

11. The multi-GPU computing device of claim 8, wherein the second GPU supports fewer functions than the first GPU.

12. The multi-GPU computing device of claim 11, wherein the functions supported by the second GPU include powering up the second GPU graphics subsystem and making the second frame buffer visible to the first GPU.

13. The multi-GPU computing device of claim 11, wherein the second GPU is an earlier version of the first GPU.

14. The multi-GPU computing device of claim 8, wherein the first GPU subsystem and the second GPU subsystem are designated based on their respective capability as specified in a configuration file accessible by an operating system of the multi-GPU computing device.

15. A non-transitory computer-readable medium containing a sequence of instructions, which when executed by a multi-GPU computing device, causes the multi-GPU computing device to:
    designate a first GPU subsystem in the multi-GPU computing device as a rendering engine, wherein the first GPU subsystem includes a first GPU and a first frame buffer;
    designate a second GPU subsystem in the multi-GPU computing device as a cache accelerator, wherein the second GPU subsystem includes a second GPU and a second frame buffer;
    direct an upstream memory access request associated with an address from the first GPU subsystem to a port associated with a first address range;
    configure the first address range to cover a first portion of a second address range assigned to the second GPU subsystem;
    determine that the memory access request is directed to a second portion of the second address range, wherein the second portion of the second address range is not accessible to the first GPU; and
    redirect the memory access request to a register communicatively coupled to the second frame buffer to cause the second portion of the second address range to be accessible by the first GPU.

16. The non-transitory computer readable-medium of claim 15, further containing a sequence of instructions, which when executed by the switch, causes the switch to write data included in the memory access request to the second portion of the second address range.

17. The non-transitory computer readable-medium of claim 15, further containing a sequence of instructions, which when executed by the switch, causes the switch to configure the first address range to cover a combined address range to support a first system containing multiple cache accelerators and a second system containing multiple cache accelerators coupled to the port, wherein the combined address range is generated by combining a third address range assigned to the first system with a fourth address range assigned to the second system.

18. The non-transitory computer readable-medium of claim 15, wherein the second GPU supports fewer functions than the first GPU.

19. The non-transitory computer readable-medium of claim 18, wherein the functions supported by the second GPU include powering up the second GPU graphics subsystem and making the second frame buffer visible to the first GPU.

20. The non-transitory computer readable-medium of claim 15, further containing a sequence of instructions, which when executed by the multi-GPU computing device, causes the multi-GPU computing device to designate the first GPU subsystem and the second GPU subsystem based on their respective capability as specified in a configuration file accessible by an operating system of the multi-GPU computing device.

* * * * *